United States Patent
Fischer

(12) 
(10) Patent No.: US 6,393,967 B2
(45) Date of Patent: May 28, 2002

(54) DEVICE FOR INDICATING THE CALCIFICATION STATUS OF FLOW HEATERS, PARTICULARLY IN EXPRESSO MACHINES

(75) Inventor: Daniel Fischer, Romanshorn (CH)

(73) Assignee: Eugster/Frismag AG, Romanshorn (CH)

( * ) Notice: Subject to any disclaimer, the term of this patent is extended or adjusted under 35 U.S.C. 154(b) by 0 days.

(21) Appl. No.: 09/751,390

(22) Filed: Jan. 2, 2001

(30) Foreign Application Priority Data

Dec. 31, 1999 (DE) ...................................... 299 23 063 U

(51) Int. Cl.[7] ................................................ A47J 31/58
(52) U.S. Cl. ............................. 99/285; 99/280; 99/288; 392/465; 219/506
(58) Field of Search ......................... 99/285, 288, 280, 99/281; 392/465, 471, 480, 484, 467, 502, 479; 219/506

(56) References Cited

U.S. PATENT DOCUMENTS 4,139,761 A * 2/1979 Obrowski ................. 99/218 X 4,292,499 A * 9/1981 Kleinschmidt et al. ... 99/285 X
5,369,398 A * 11/1994 Vancha ..................... 99/285 X

FOREIGN PATENT DOCUMENTS

| DE | 25 25 647 | 1/1976 |
| DE | 26 52 419 | 5/1978 |
| DE | 77 11 177 | 1/1981 |

* cited by examiner

Primary Examiner—Reginald L. Alexander
(74) Attorney, Agent, or Firm—Venable; Norman N. Kunitz

(57) ABSTRACT

An arrangement for indicating the calcification status of flow heaters, particularly in espresso machines, with the flow heater having a cold-water inlet line and a hot-water outflow line, and which is intended to precisely indicate the calcification status, yet have an uncomplicated design. For this purpose, a differential-pressure fluid gauge (9) is provided, with the gauge having two pressure chambers (11, 12) separated by a diaphragm, with one of the pressure chambers (11) being in a fluid-conducting connection with the cold-water inlet line (4) and the other pressure chamber (12) being in a fluid-conducting connection with the hot-water outflow (5). The diaphragm acted upon by the pressure difference between the two chambers (11, 12) is coupled to indicator elements.

6 Claims, 1 Drawing Sheet

DEVICE FOR INDICATING THE CALCIFICATION STATUS OF FLOW HEATERS, PARTICULARLY IN EXPRESSO MACHINES

CROSS REFERENCE TO RELATED APPLICATIONS

The present application claims the right of foreign priority of German Application No. DE 299 23 063.5 filed Dec. 31, 1999, the subject matter of which is incorporated herein by reference.

BACKGROUND OF THE INVENTION

The invention relates to a device for indicating the calcification status of flow heaters, particularly in espresso machines, with the flow heater having a cold-water inlet and a hot-water outflow.

In the operation of a flow heater of this type, a pump conveys water from a cold-water reservoir through the cold-water inlet and adjoining, indirectly-heated pipes of the flow heater, where the water is heated. Afterward, the hot or scalding water exits a hot-water outflow of the flow heater and is pumped into a brewing apparatus. The water is heated to about 96° C. in the flow heater, also referred to as a thermoblock. Particularly if the cold water is very hard, sediment builds up in the heated pipes—also called flow-through pipes—after an operational time that is a function of the degree of hardness. The sediment increasingly narrows the clearance cross section of the flow-through pipes, thereby decreasing their efficiency and limiting the function of the flow heater, until the heater becomes blocked. The functioning capability of the flow heater can be restored through the use of commercially-available decalcifying agents, but this is an additional procedure that is often avoided because it is relatively laborious. Therefore, indicators are provided for clearly indicating when decalcifying is necessary.

Counters that indicate the number of batches through the flow heater are known as indicator devices. Because the throughput quantities for preparing a beverage lie within a predetermined range, the local degree of water hardness can be used to find an empirical value that determines how many batches should be processed between decalcifying procedures. This device, however, yields only imprecise results and approximations of the actual calcification status.

A measurement system known from the state of the technology uses the external temperature of the flow heater to estimate its calcification status. As the thermally-insulating calcification layer builds up, the external temperature increases due to the less effective dissipation of generated heat by the water flowing through the flow-through pipes. This thermal measuring device, however, operates imprecisely, because the measurable external temperature of the flow heater is dependent on further parameters, particularly previous brewing processes, if the required external heating of the flow heater has not diminished completely before the start of a new brewing process with a detection of the external temperature.

It is also known to insert a flow detector into the supply line or discharge line of the flow heater for measuring the change in the flow speed, namely a decrease in the speed with increased calcification in the flow heater. A flow detector of this type is, however, technically too complicated for applications such as small espresso machines intended for household use.

SUMMARY OF THE INVENTION

It is therefore the object of the present invention to provide a device for indicating the calcification status of flow heaters that is technically uncomplicated, yet permits a fairly precise indication of the actual calcification status of the flow heater. This indication is intended to be a direct measure for the present calcification status, without a separate, subsequent accounting of further parameters such as the degree of hardness of the cold water.

The above object is achieved according to the present invention by a device for indicating the calcification status of a flow heater having a cold-water inlet line and a hot-water outflow line, with the device comprising a differential-pressure fluid gauge having first and second pressure chambers and a diaphragm disposed between and separating the fist pressure chamber from the second pressure chamber. The first pressure chamber is in a fluid-conducting connection with the cold-water inlet line, the second pressure chamber is in a fluid-conducting connection with the hot-water outflow line, and, the diaphragm acted upon by the pressure difference between the first pressure chamber and the second pressure chamber is coupled to an indicator.

The solution is based on the principle that the flow through the flow heater is detected by an uncomplicated differential-pressure fluid gauge chamber, in which a diaphragm separates two pressure chambers that act in opposite directions on the diaphragm. Of the pressure chambers, the first is in a fluid-conducting connection with the cold-water inlet of the flow heater, and the second is connected to the hot-water outflow of the heater. The outward bending of the diaphragm that results due to the pressure difference between the cold-water inlet and the hot-water outflow, and thus in the two chambers, during the operation of the flow heater stands as a measure for the flow resistance in the flow heater, and therefore the calcification of the heater. The deformation of the resiliently-yielding diaphragm itself can indicate the calcification of the flow heater, for example if a portion of the diaphragm projects out of the housing of the differential-pressure fluid gauge chamber. The diaphragm is, however, preferably connected to further mechanical indicator elements, such as a pointer that moves relative to fixed markings, or electrical indicator elements, such as a light-emitting-diode (LED) display that is actuated by the diaphragm for signaling the need to decalcify the machine. This represents a reliable decalcification indicator. It must be borne in mind here that, according to the invention, the differential pressure with a water hardness of about 20° increases by about 1 bar after approximately 40 liters have passed through the flow heater, which can effect a considerable change in the status of the indicator elements.

According to a preferred embodiment, the diaphragm is advantageously embodied as a catch-spring disk that is dimensioned to snap when a predetermined differential pressure equal to a maximum permissible differential pressure is attained. This snapping is therefore effected at a differential pressure that is predetermined by the dimensioning of the catch-spring disk, and takes into consideration a differential-pressure tolerance range with which possible pressure influences due to a throttle effect—which varies within limits—of a brewing head connected to the hot-water outflow can be taken into consideration.

To avoid residual water in the differential-pressure fluid gauge chamber, according to a feature of the invention, the chamber is disposed above the flow heater, with the diaphragm being oriented nearly vertically. With this positioning, residual water can flow out of the chambers of the differential-pressure fluid gauge chamber due to the effect of gravity. The residual water is also sucked out after the brewing process due to a corresponding vacuum in the flow heater and the brewing head.

As an alternative to the above-mentioned indicators, optical indicator elements can be connected to the diaphragm. The elements can include a counter in particular.

Alternatively, electrical indicator elements that can be controlled by the diaphragm can be provided in place of the optical indicator elements. These indicator elements can comprise an LED in a circuit with a switch contact that is actuated by the diaphragm.

BRIEF DESCRIPTION OF THE DRAWINGS

An exemplary embodiment of the invention is described in detail below in conjunction with a drawing with three figures. Further features and advantages of the invention ensue from this description.

DETAILED DESCRIPTION OF THE PREFERRED EMBODIMENTS

Figure 1:
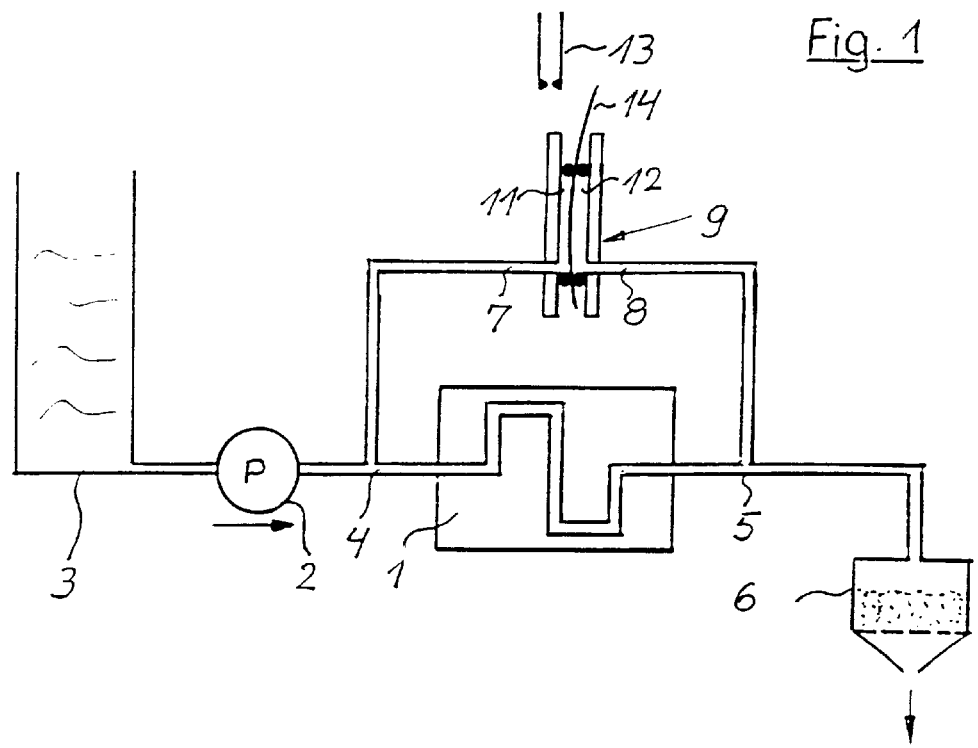
FIG. 1 is a schematic representation of the water system of an espresso machine, in which a flow heater and a differential pressure fluid gauge according to the invention is disposed.

In FIG. 1 a flow heater, which is represented by 1, is supplied from a cold-water reservoir 3 by a pump 2. More specifically, the cold water is fed in at a cold-water inlet line 4. The flow heater 1 releases the water it has heated via a hot-water outflow line 5, which is in a fluid-conducting connection with a brewing head 6 of an espresso machine for brewing the coffee grounds located in the brewing head. To this point, the device design is known. However, other types of brewing heads as well as other types of uses for the hot water may be provided.

For indicating the calcification status of the flow heater 1, respective lines branch off from the cold-water inlet line 4 and hot-water outflow 5, leading to a pump-side water-inlet connector 7 and a brewing-head-side water-outflow connector 8 of a differential-pressure fluid gauge chamber 9 that represents a measuring capsule. The essential element of the measuring capsule 9 is a diaphragm 10, preferably as shown a catch-spring disk, which has a spherical curvature and separates a first pressure chamber 11 from a second pressure chamber 12, into which the water-inlet connector 7 and the water outlet connector 8, respectively, terminate. The two pressure chambers 11 and 12 can also be referred to as pressure pockets.

The indicator elements controlled by the catch-spring disk 10 include a switch contact 13, which turns a light (not illustrated) in a circuit on or off, for example. For this purpose, the switch contact is actuated by an extension of the catch-spring disk 10, as indicated by a tab 14 that projects from the measuring capsule 9 in the illustrated embodiment.

Figure 2:
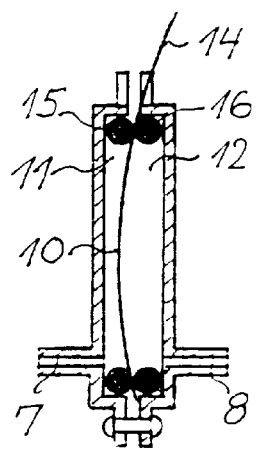
FIG. 2 is a detail of FIG. 1, namely a differential-pressure fluid gauge chamber having a catch-spring disk as a diaphragm, in a vertical section.
Figure 3:
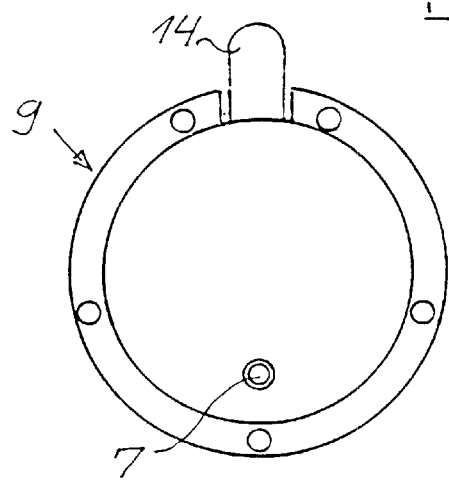
FIG. 3 is a side view of the differential-pressure fluid gauge chamber according to FIG. 2.

In the inoperative position, and when the differential pressure between the first pressure chamber 11 and the second pressure chamber 12 does not exceed a predetermined value, the catch-spring disk 10 assumes the position illustrated in FIG. 2. This position also corresponds to an extensively or completely calcified state of the flow heater, in which the pressure difference between the first pressure chamber 11 and the second pressure chamber 12 is correspondingly small. In this instance, the switch contact 13 is not actuated by the tab 14 of the catch-spring disk 10. If, in contrast, the flow resistance in the flow heater 1 exceeds a predetermined value due to calcification, the pressure difference between the first pressure chamber 11 and the second pressure chamber 12 increases correspondingly. Consequently, the curvature of the catch-spring disk 10 snaps in the opposite direction, as illustrated in FIGS. 1 and 2, with the tab 14 closing the switch contact 13. Further electrical indicators can then visually indicate the calcification status that makes decalcifying advisable.

The arrangement of the differential-pressure fluid gauge chamber 9 can be seen as being above the flow heater 1, with the diaphragm or catch-spring disk 10 being oriented nearly vertically, so that residual water flows out of the pressure chambers 11, 12 and is additionally sucked out of them.

It can be seen in detail from FIG. 2 how the catch-spring disk is seated between O-rings 15, 16 in the differential-pressure fluid gauge chamber 9, so that it can perform its snapping function and seal the two pressure chambers 11 and 12 from one another.

The invention now being fully described, it will be apparent to one of ordinary skill in the art that many changes and modifications can be made thereto without departing from the spirit or scope of the invention as set forth herein.

I claim:

1. An arrangement for indicating the calcification status of a flow heater, comprising: a flow heater having a cold-water inlet line and a hot-water outflow line, a differential-pressure fluid gauge having first and second pressure chambers and a diaphragm disposed between and separating the first pressure chamber from the second pressure chamber, with the first pressure chamber being in a fluid-conducting connection with the cold-water inlet line and the second pressure chamber being in a fluid-conducting connection with the hot-water outflow line; and, the diaphragm acted upon by the pressure difference between the first pressure chamber and the second pressure chamber is coupled to an indicator.

2. The arrangement according to claim 1, wherein the diaphragm is a catch-spring disk that is dimensioned such that it snaps when a predetermined pressure difference is attained.

3. The arrangement according to claim 2, wherein the differential-pressure fluid gauge is disposed above the flow heater with a nearly vertical diaphragm.

4. The arrangement according to claim 1, wherein the differential-pressure fluid gauge is disposed above the flow heater with a nearly vertical diaphragm.

5. The arrangement according claim 1, wherein the indicator element that is connected to the diaphragm is an optical element.

6. The arrangement according to claim 1 wherein the indicator element coupled to the diaphragm is an electrical indicator element that can be controlled by the diaphragm.

* * * * *